(12) United States Patent
Stoakes et al.

(10) Patent No.: US 8,620,845 B2
(45) Date of Patent: Dec. 31, 2013

(54) IDENTIFYING APPLICATION METADATA IN A BACKUP STREAM

(76) Inventors: Timothy John Stoakes, One Tree Hill (AU); Andrew Charles Leppard, Greenacres (AU)

( * ) Notice: Subject to any disclaimer, the term of this patent is extended or adjusted under 35 U.S.C. 154(b) by 779 days.

(21) Appl. No.: 12/237,363

(22) Filed: Sep. 24, 2008

(65) Prior Publication Data

US 2010/0077161 A1 Mar. 25, 2010

(51) Int. Cl.
*G06F 17/00* (2006.01)
*G06N 5/00* (2006.01)

(52) U.S. Cl.
USPC ............................................. 706/45; 711/167

(58) Field of Classification Search
None
See application file for complete search history.

(56) References Cited

U.S. PATENT DOCUMENTS

| | | | |
|---|---|---|---|
| 7,801,894 B1* | 9/2010 | Bone et al. | 707/737 |
| 2006/0259516 A1* | 11/2006 | Stakutis et al. | 707/200 |
| 2007/0073688 A1* | 3/2007 | Fry | 707/6 |
| 2007/0192286 A1* | 8/2007 | Norton et al. | 707/2 |
| 2008/0184001 A1* | 7/2008 | Stager | 711/167 |
| 2009/0228533 A1* | 9/2009 | Reddy et al. | 707/204 |

\* cited by examiner

*Primary Examiner* — Kakali Chaki
*Assistant Examiner* — Luis Sitiriche

(57) ABSTRACT

A method of identifying application metadata in a backup stream comprises finding a known application metadata signature within a backup stream. A source application of user data in the backup stream is identified based upon the known application metadata signature. Application metadata, which has been generated by the source application, is removed from consideration by a data de-duplicator which is used to perform data de-duplication on the backup stream.

7 Claims, 8 Drawing Sheets

A PRIORI LIST
212

1. RCJH<u>BAR</u>
2. EUEUKSU<u>BAT</u>
3. LCHS<u>BAM</u>LC
4. WW<u>CAT</u>GRR
5. <u>CAR</u>65MFB
6. KU<u>CAN</u>RPT

IDENTIFYING APPLICATION METADATA IN A BACKUP STREAM

BACKGROUND

Often a portion of data being backed up by a user or other entity comprises repetitive data. Consider an example where an electronic message ("e-mail") is sent to 100 recipients, it may be stored 100 times in a data storage system, constituting some amount of repetition. In another example, multiple copies of slightly different versions of a word processing document are stored in a data storage system. A large portion of each of the documents is likely to constitute repetition of data stored in conjunction with one or more of the other instances of the word processing document.

Data de-duplication is sometimes used to reduce the amount of repetitive data stored in a data storage system. Presently most data de-duplication is performed in software which executes on a processor within or coupled with a data storage system. For example, such de-duplication can be performed by a processor within or coupled with a data storage system to which an entity (e.g., a user, business, network) sends a backup stream in conjunction with a data backup. Backup software from an independent software vendor (ISV) is typically used to generate such a backup stream from the entity's stored data. Some examples of storage systems which can utilize data de-duplication include, but are not limited to: a storage appliance, a backup appliance, a network attached storage, a virtual tape library, and a disk array.

Data de-duplication often involves identifying duplicate data segments in a stream of data, such as a backup stream, then replacing an identified duplicate data segment with a smaller reference such as a pointer, code, dictionary count, or the like, which references a data segment, pointer, or the like stored in a de-duplication library. In the case of a backup stream, the de-duplicated backup stream is then stored. Because the de-duplicated backup stream is smaller in data size than it was prior to de-duplication, such de-duplication allows more data to be stored in a fixed size data storage system than would otherwise be possible. Because less storage space is required, in some environments this allows backed up data to be retained for a longer time before deletion. Additionally, it is appreciated that the de-duplication process can be reversed to reassemble the backup stream if access to the backed up data is desired.

BRIEF DESCRIPTION OF THE DRAWINGS

The accompanying drawings, which are incorporated in and form a part of this specification, illustrate several embodiments of the subject matter and, together with the Description of Embodiments, serve to explain principles discussed below.

FIG. 4 shows an example a priori list of application metadata signatures, according to an embodiment.

Figure 1:
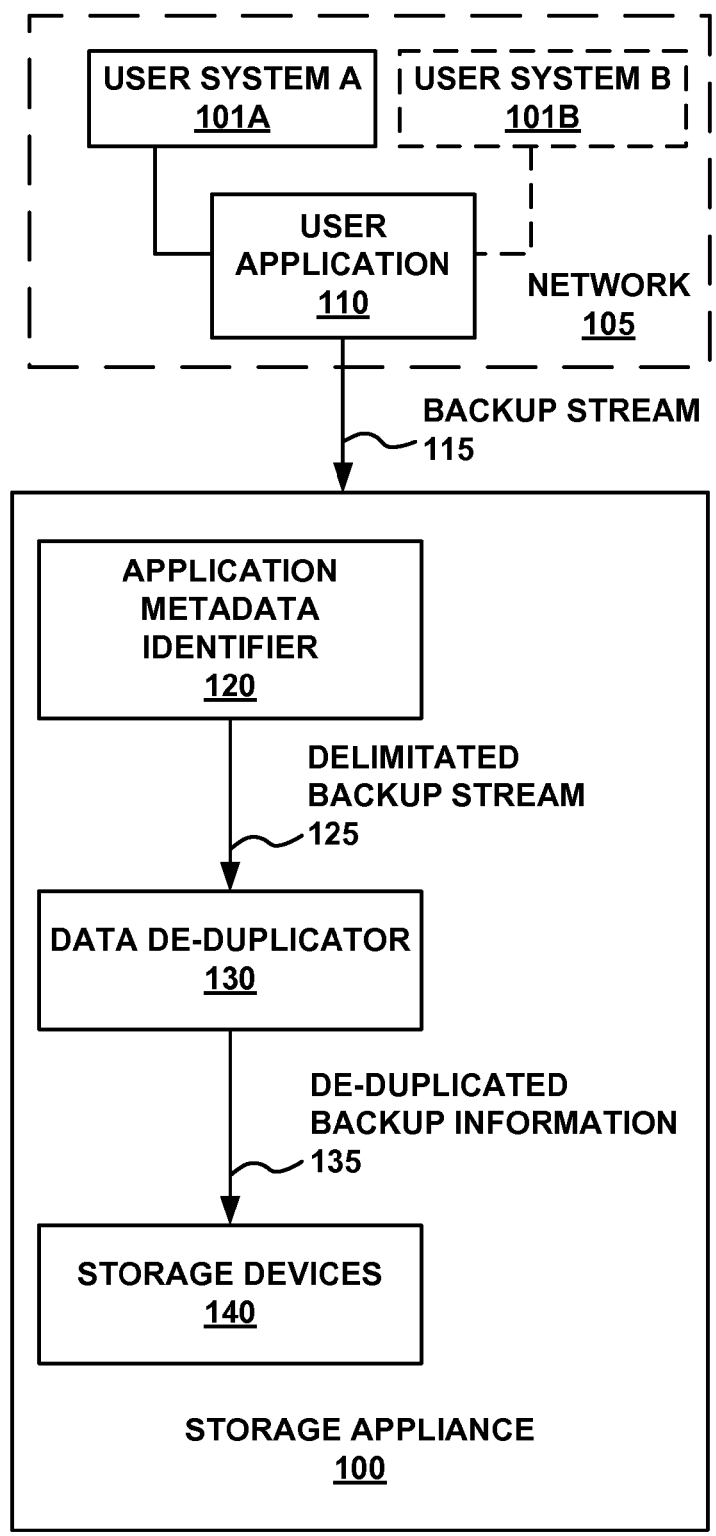
FIG. 1 is a block diagram of an example backup appliance, in accordance with an embodiment of the subject matter described herein.

The drawings referred to in this Brief Description of Drawings should be understood as not being drawn to scale unless specifically noted.

Description of Embodiments

Reference will now be made in detail to various embodiments of the subject matter, examples of which are illustrated in the accompanying drawings. While description of various embodiments will be made herein, it will be understood that they are not intended to limit to these embodiments of the subject matter. On the contrary, the presented embodiments are intended to cover alternatives, modifications and equivalents, which may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the description of embodiments, discussions utilizing terms such as "performing," "identifying," "removing," "providing," "searching," "finding," "generating," "utilizing," "editing," or the like, refer to the actions and processes of a computer system, integrated circuit, processor, application metadata identifier, or similar electronic computing device. The electronic computing device manipulates and transforms data represented as physical (electronic) quantities within the computing device's registers and memories into other data similarly represented as physical quantities within the computing device's memories or registers or other information storage coupled with the electronic computing device. In some embodiments, as described herein, a processor and/or electronic computing device resides within and/or is coupled with a storage appliance, backup appliance, network attached storage, virtual tape library, or similar data storage system. In some embodiments the electronic computing device comprises an Application Specific Integrated Circuit (ASIC). In some embodiments, an application metadata identifier, as described herein, is implemented all or in part as a hardware device, such as a processor, computer system, circuit card, or an integrated circuit. In some embodiments, an application metadata identifier, as described herein, is implemented as computer executable instructions executed on a processor to cause the processor to perform one or more functions of the application metadata identifier.

Overview of Discussion

A storage appliance is a system for storing information, which in various embodiments, includes classes of storage systems such as backup appliances, network attached storage, virtual tape library (VTL), and the like. Generally, but not always, a storage appliance comprises a plurality of hard disk drive, such as an array of disk drives, which are configured to receive user data, such as backup stream for storage. In some applications a storage appliance performs data de-duplication on a stream of received data, such as a backup stream. One example of a storage appliance, which can operate as a backup appliance, network attached storage, and/or a virtual tape library, is the DXi-series of storage appliances produced by Quantum® Corporation of San Jose, Calif.

Backup streams which are formatted by ISV (independent software vendor) backup application software for transmission to storage targets, such as VTLs among others, include explanatory header information which describes the format of the backup stream, format of metadata, lengths of user data blocks, lengths and location of metadata blocks, and/or other information. This information can be used to identify backup application metadata within a backup stream. However, in many instances, this header information is unavailable or does not describe all of the different types of source application metadata included in a backup stream.

During data de-duplication, the acts of scanning for and parsing/partitioning data stream segments to de-duplicate on can be confounded by the application metadata that a backup application or other non-backup application adds to the stream. As will be described herein, one mechanism to reduce and/or eliminate this confounding and thus achieve higher ratios of de-duplication is to filter a received data stream based upon known metadata signatures associated with a list of known source applications. Filtering a stream, such as a backup stream, in this manner allows identification of application metadata within the stream without knowledge of the header information, or to find application metadata which is not described by a stream's header. While filtering may not identify all application metadata in a stream, that which is identified and then not considered in data de-duplication process will typically improve the data de-duplication ratio of a data de-duplicator which performs data de-duplication on a stream.

Discussion below will begin with a description of an example storage appliance which includes an example application metadata identifier. Components of the example storage appliance and the example application metadata identifier will be described. An example backup stream will be described, as will an example delimitated backup stream. An example of an a priori list of application metadata signatures will be described as will an example string search data structure which has been optimized from the a priori list. Operation of the example storage appliance and application metadata identifier will then be described in more detail in conjunction with a description of an example method of identifying application metadata in a backup stream. Finally, discussion will proceed to a description of an example computer system, with which or upon which various embodiments described herein may be implemented.

EXAMPLE STORAGE APPLIANCE

FIG. 1 is a block diagram of an example storage appliance 100, in accordance with an embodiment of the subject matter described herein. As shown in FIG. 1, in one embodiment, storage appliance 100 comprises an application metadata identifier 120, a data de-duplicator 130, and storage devices 140, which are coupled to one another to exchange information during the operation of storage appliance 100. In one embodiment, storage appliance 100 is a tapeless backup target which presents one or more interfaces to an ISV (independent software vendor) backup application, such as user application 110. One example of an interface, which is presented in some embodiments, is that of a virtual tape library, which user application 110 sees as a virtual tape library. In one embodiment, the VTL interface accepts data formatted in accordance with tape library specifications. Another example of an interface, which is presented in some embodiments, is that of a network attached storage for storing and sharing files among entities coupled with a network. It is appreciated that, in some embodiments, storage appliance 100 may present as additional or alterative interfaces as well. In one embodiment, storage appliance 100 is a DXi-series storage appliance produced by Quantum® Corporation of San Jose, Calif.

In one embodiment, storage appliance 100 is coupled with a user application 110, which may be an ISV backup application coupled with a single computer system (e.g., user system 101A), multiple computer systems (e.g., user system A (101A), user system B (101B), etc.), or a network 105 (which may include one or more computer systems or a central storage system). Consider an example, where a storage appliance 100 is being utilized by user application 110 as a backup appliance. Storage appliance 100 receives a backup stream generated by an ISV backup application (user application 110). Some examples of ISV backup applications include: Commvault Galaxy®, Veritas NetBackup by Symantec™, and Networker by $EMC^2$. Typical ISV backup applications, of which there are many examples, configure a user's computer system and/or network to interact with a storage appliance for storing data. In one example, a backup stream 115 is generated by the ISV backup application from user data on a computer or a network. For example, in various embodiments, backup stream 115 comprises information from a single computer system (e.g., 101A), multiple computer systems (e.g., 101A, 101B, etc.), or a network (e.g., network 105). Backup stream 115 includes user data packaged with application metadata from the source application which generated the backup stream (e.g., application metadata generated by the ISV backup program which generated the backup stream). For example, when an entity employs a backup application to create an archive or backup of data, the backup application inserts application metadata which is interspersed with blocks of user data at intervals, which may or may not be regular intervals, in backup stream 115. It is appreciated that, in some embodiments, user data and application data from a variety of source applications may be interleaved on backup stream 115.

In some embodiments, backup stream 115 may also include other application metadata generated by other source applications. For example, some user applications 110, such as electronic mail applications also insert metadata within an archived file of user data. This application metadata provides instructions to the source application which inserts the metadata. Thus, for example, when the user data being backed up includes electronic mail data, there may be non-backup application metadata, in backup stream 115, which is generated by an electronic mail application. Such non-backup application metadata may be nested within or interspersed with the user data (e.g., e-mails and attachments) from the electronic mail application and/or with the backup application metadata.

Generally it is the job of this ISV backup application to package up whatever data it is supposed to be backing up and to push it in this packaged form (e.g., backup stream 115) into storage appliance 100 in a specific format utilized by the ISV backup application. This format, which includes backup application metadata, allows the ISV backup application to retrieve and reassemble the backed up data at some future time.

Application metadata identifier 120 operates to identify one or more fields of application metadata within a data stream, such as backup stream 115, which is received at storage appliance 100 from a user application 110, such as a backup application. Application metadata identifier 120 utilizes an a priori (known in advance) listing of application metadata signatures to search within backup stream 115 for application metadata associated with source applications whose metadata signature(s) are included in the a priori list of application metadata signatures. Components and operation of application metadata identifier 120 are described in more detail in conjunction with FIG. 2 and the description of the method illustrated by flow diagram 700 of FIG. 7. Application metadata identifier 120 identifies application metadata within backup stream 115 without knowledge of explanatory header information which may be included with backup stream 115. Thus, application metadata identifier 120, in one embodiment, finds application metadata in backup stream 115 and identifies the source application of the user data in the stream without prior knowledge of what source application was used to generate backup stream 115.

In one embodiment, application metadata identifier 120 delimitates (sets bounds or enforces boundaries or enforces an interpretation of) backup stream 115 such that application metadata identified by application metadata identifier 120 is edited out of backup stream 115 or instruction is provided to data de-duplicator 130 regarding the location of identified application metadata within backup stream 115. The result of this delimitation is delimitated backup stream 125. In one embodiment, delimitated backup stream 125 comprises a version of backup stream 115 which has been edited to remove identified application metadata. In one embodiment, such removed application metadata is stored within an application metadata storage location. Pointers, placeholders or other information such as a blueprint of backup stream 115 may also be stored to facilitate proper reconstruction of a backup stream to re-incorporate removed application metadata. In one embodiment, delimitated backup stream 125 comprises backup stream 115 along with skip instructions and/or other delimitation instructions for data de-duplicator 130. In one embodiment, a skip instruction informs data de-duplicator 130 of the location of a range of application metadata within the stream so that data de-duplicator 130 can skip, ignore, or otherwise remove the range of application metadata from consideration when parsing the backup stream into blocklets for data de-duplication.

Data de-duplicator 130 is coupled with application metadata identifier 120 and storage devices 140 and operates to de-duplicate a received data stream, such as delimitated backup stream 125, prior to storing the de-duplicated information from the data stream on storage devices 140. In one embodiment, this comprises performing de-duplication of delimitated backup stream 125 (which comprises identified or removed application metadata). In one embodiment, data de-duplicator 130, parses through delimitated backup stream 125 to partition delimitated backup stream 125 into data segments called blocklets upon which a de-duplication process can be performed. The de-duplication process, performed by data de-duplicator 130, identifies unique data segments (blocklets) which are then stored only once within storage devices 140 of storage appliance 100. Identified duplicate blocklets are "de-duplicated" by the use of a pointer or some other mechanism to mark their position. For example, in one embodiment, a smaller pointer is stored instead of the duplicate blocklet. De-duplication by data de-duplicator 130 produces de-duplicated backup information 135 from delimitated backup stream 125. Data de-duplicator 130 outputs de-duplicated backup information 135 for storage on storage devices 140.

In one embodiment, data de-duplicator 130 employs a form of data scanning which includes data driven parsing of a received data stream into blocklets upon which de-duplication is performed. In one embodiment, data de-duplicator employs the data driven parsing/partitioning of a stream and de-duplication technique described in U.S. Pat. No. 5,990,810 to Ross Williams, entitled, "METHOD FOR PARTITIONING A BLOCK OF DATA INTO SUBBLOCKS AND FOR STORING AND COMMUNICATING SUCH SUBBLOCKS," which is incorporated herein by reference in its entirety. In other embodiments data de-duplicator 130 partitions and parses a received data stream into other regular and/or variable length blocklets based upon one or more other de-duplication techniques.

In these and in other forms of data de-duplication, the acts of scanning for and partitioning stream segments to de-duplicate on can be confounded by the application metadata that a backup application or other non-backup application adds to the stream. The confounding can occur because the application metadata interrupts the contiguousness of user data in a stream, and causes otherwise repetitive instances of interrupted user data to instead appear as unique data to a data de-duplicator. Consider an example where an ISV backup application packages customer files together and inserts metadata between files and sometimes within the files, usually at regular boundaries. It is these pieces of metadata, interspersed within user data of a backup stream, which can confound the scanning algorithm of a data de-duplicator. Often the result is that the de-duplication ratio (the amount of repetitive data which is effectively not stored multiple times because in has been de-duplicated) goes down or is not as high as it could be in the absence of the application metadata.

By supplying data de-duplicator 130 with delimitated backup stream 125, which removes or identifies the locations of identified application metadata, this confounding of data de-duplicator 130 is reduced or eliminated. This is because, in delimitated backup stream 125, application metadata in backup stream 115 which has been identified by application metadata identifier 120 is removed from consideration by data de-duplicator 130 during conduct of data de-duplication processes performed by data de-duplicator 130.

Storage devices 140 comprise a plurality of direct access storage devices, such as hard disk drives and/or solid state memory. Storage devices 140 are coupled with data de-duplicator 130 to receive and store de-duplicated backup information 135 which is output from data de-duplicator 130. In one embodiment, storage devices 140 comprise an array of hard disk drives, such as a Redundant Array of Independent/Inexpensive Disks (RAID).

EXAMPLE APPLICATION METADATA IDENTIFIER

Figure 2:
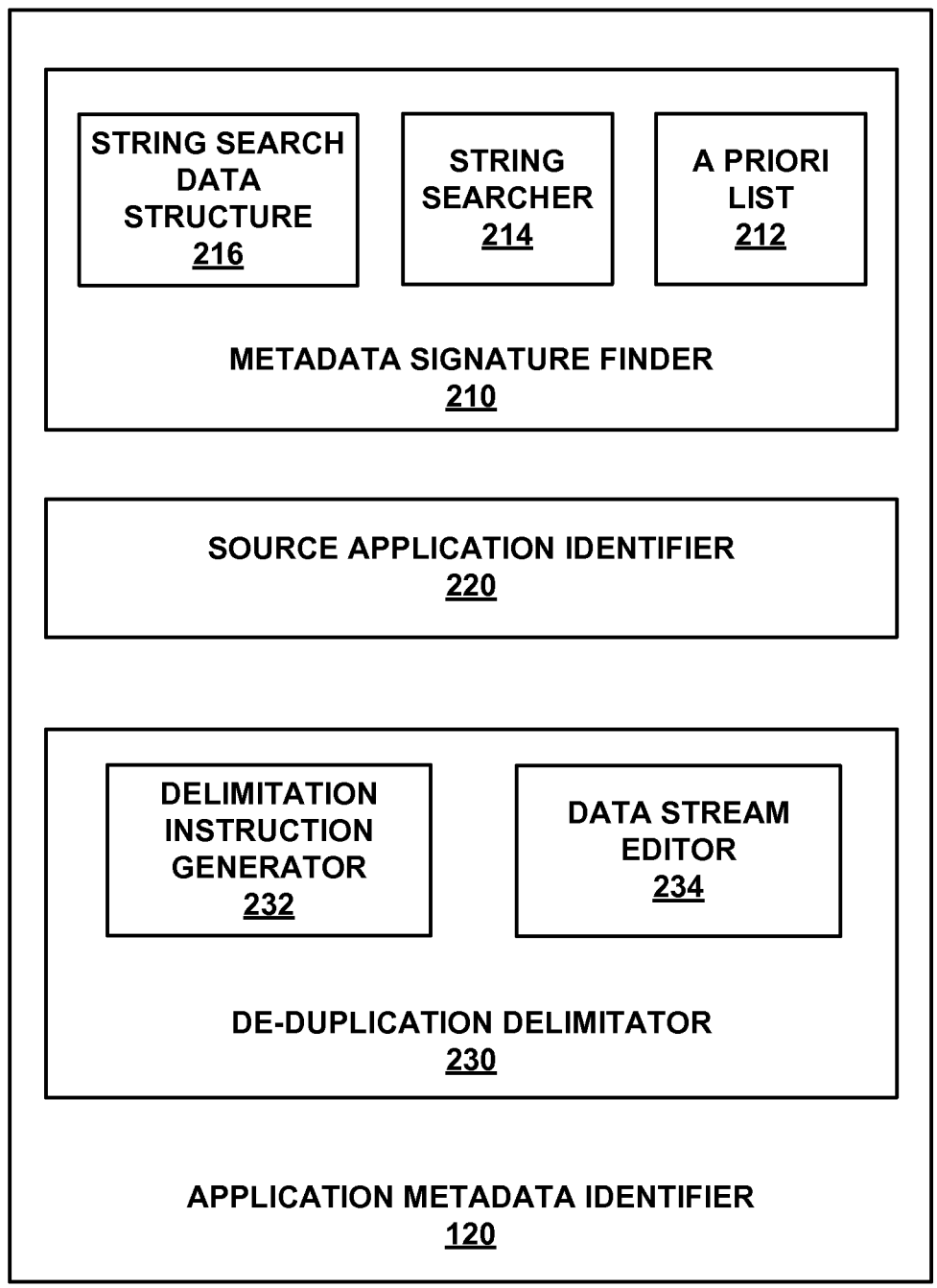
FIG. 2 is a block diagram of an example application metadata identifier, according to an embodiment.

FIG. 2 is a block diagram of an example application metadata identifier 120, according to an embodiment. In one embodiment application metadata identifier is an apparatus, which is or may be included in or coupled with a storage appliance, such as storage appliance 100. In one embodiment, application metadata identifier 120 comprises metadata signature finder 210, source application identifier 220, and de-duplication delimitator 230, which are coupled with one another as required to exchange information for the operation of application metadata identifier 120. It is appreciated that the functions of these identified components may be combined with those of one another or of other components and that in some embodiments, additional and/or alternative components within the spirit of this discussion may be included in an embodiment of application metadata identifier 120.

Metadata signature finder 210, in one embodiment, finds a known application metadata signature within a backup stream. This finding is accomplished by searching on an a priori list of application metadata signatures 212 within the data of a data stream, such as backup stream 115. A priori list of application metadata signatures 212 is a list assembled of unique data sequences associated with metadata from one or more user applications 110, such as ISV backup applications. A priori list of application metadata signatures 212 is assembled in advance based upon known characteristics of metadata created by one or more user applications 110. In one embodiment, a priori list of application metadata signatures 212 is included as a component of metadata signature finder 210. An example a priori list of application metadata signatures 212 is shown and described in conjunction with FIG. 4. In one embodiment, metadata signature finder 210 uses brute force searching or other searching techniques to search all data in a received backup stream 115 for all metadata signatures included on a priori list of application metadata signatures 212.

Figure 5:
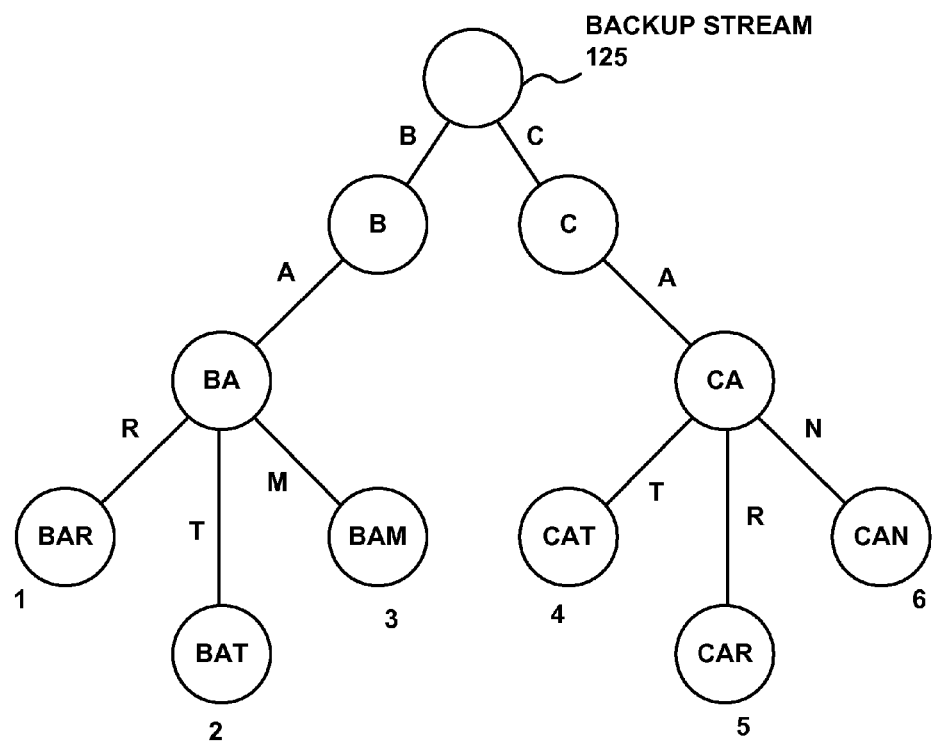
FIG. 5 shows a diagram of an example string search data structure in the form of a trie, according to an embodiment.

In one embodiment, metadata signature finder 210 includes a string search data structure 216 which is optimized from a priori list of application metadata signatures 212 for searching through backup stream 115 using a string search algorithm. The nature of string search data structure is typically dictated by the requirements of a string search algorithm employed by a string searcher 214. In some embodiments, string search data structure 216 is constructed and optimized in advance of use and is shipped as a component of metadata signature finder 210. It is appreciated that in some embodiments, string search data structure 216 is electronically updatable to incorporate changes dictated by additions, alterations, or deletions of metadata signatures from a priori list of application metadata signatures 212. In one embodiment, string search data structure 216 is formatted as a trie (also known as a prefix tree) or table which is optimized from characteristics of a priori list of application metadata signatures 212 in accordance with the requirements of a string search algorithm employed by string searcher 214. An example string search data structure 216, in the form of a trie based upon a priori list of application metadata signatures 212 (see FIG. 4) is shown in FIG. 5.

In one embodiment, metadata signature finder 210 includes a string searcher 214. String searcher 214 performs searches on string search data structure 216 within a received data stream, such as backup stream 115. String searcher 214 is a text string searcher which employs a text string search algorithm to search more efficiently through a data stream than a brute force search. The efficiency of string searcher 214 is further enhanced because the list of items being searched for is known in advance and can thus be optimized in advance (such as in a laboratory or factory environment) into string search data structure 216. In one embodiment, after an application metadata signature is found, metadata signature finder 210 confirms that the data surrounding the metadata signature is actually application metadata. In one embodiment, this function is performed by source application identifier 220. In one embodiment string search data structure 216 is prepared independently from string searcher 214, for use by string searcher 214. In another embodiment, a priori list 212 is provided once as an input to string searcher 214 and string search data structure 216 is output as an optimized search data structure which can be used at will to search for items on a priori list 212.

It is appreciated that one or more of a variety of text string search algorithms can be employed by string searcher 214, and that string search data structure 216 is optimized based upon the text string search algorithm which is utilized. In one embodiment the text string search algorithm utilized by string searcher 214 is selected from a group of string search algorithms which include, but are not limited to: a Boyer-Moore-Horspool algorithm, a Knuth-Morris-Pratt algorithm, an Aho-Corasick algorithm, an Apostolico-Giancarlo algorithm, Commentz-Walter algorithm, and a Rabin-Karp algorithm. The choice of which algorithm or combination of algorithms is used depends upon characteristics of the set of metadata signatures in a priori list 212. String search data structure 216, in various embodiments, is generated from a priori list 212 as a string search data structure in the form of a trie (prefix tree), a table, or some other format as dictated by string searcher 214.

Source application identifier 220, identifies a source application of user data in a received data stream, such as backup stream 115. The identification is based upon a known application metadata signature which has been found by metadata signature finder 210. In one embodiment, for example, source application identifier comprises a lookup table or other data structure which correlates or associates metadata signatures of a priori list 212 with the application(s) which generate the listed metadata signatures. By identifying a source application, in some embodiments, source application identifier 220 can predict or exactly determine the size (e.g., number of bytes) and location (e.g., offset within a data stream) of application metadata which has been included in a data stream by the identified source application. For example, in one embodiment, source application identifier 220 reads the exact size and/or location information directly from user data and/or application metadata. This information can be utilized to further focus metadata signature finder 210 (e.g., to skip forward in the data stream to an offset where the next application metadata should be located), to identify the range of data within the data stream which is encompassed by the application metadata, and to predict or identify locations of application metadata for de-duplication delimitator 230. It is appreciated that some functions of source application identifier 220, such as identifying an entirety of a range of application metadata associated with a metadata signature which has been found or confirming that a found metadata signature is actually a range of metadata, can be incorporated within metadata signature finder 210.

In one embodiment, metadata signature finder 210 includes a de-duplication delimitator 230. De-duplication delimitator 230 operates to remove application metadata in a received data stream, such as backup stream 115, from consideration by a data de-duplicator, such as data de-duplicator 130, which is used to perform data de-duplication on the backup stream. The application metadata which is removed from consideration is application metadata which has been generated by a source application identified by source application identifier 220 and/or application metadata which has been found by metadata signature finder 210.

In one embodiment, de-duplication delimitator 230 includes a delimitation instruction generator 232. Delimitation instruction generator 232 generates one or more of a variety of de-duplication delimiting instructions in regards to application metadata and/or user data in a data stream.

In one embodiment, delimitation instruction generator 232 generates and provides a skip instruction to data de-duplicator 130 such that a location of identified application metadata is ignored during data de-duplication of a data stream, such as backup stream 115. In one embodiment, this skip instruction comprises information such as an offset within the data stream and a number of bytes included in the application metadata. For example, in one embodiment this comprises an offset of the first byte of the application metadata, and the length of the application metadata block. In one embodiment, one or more of these skip instructions are packaged with a data stream to create a delimited data stream.

In one embodiment, delimitation instruction generator 232 generates and provides an informative delimitation instruction to data de-duplicator 130. In one embodiment, delimitation instruction generator 232 culls information from an application metadata block or retrieves information regarding a file type of user data of an identified source application and uses such information to generate and provide an informative instruction to data de-duplicator 130 such that a particular block or blocks of user data are treated in a particular manner during data de-duplication of a data stream, such as backup stream 115. For example, in one embodiment, where a particular application metadata block is the initial metadata block in a new stream of user data, the metadata block includes special information such as the number of metadata blocks, the file type of user data (e.g., compressed, uncompressed, or other file type information); and/or the number of user data bytes which follow the initial application metadata block. Thus, in various embodiments, an informative instruction conveys information about the user data which may or does assist data de-duplicator 130 in performing de-duplication on a user data in a data stream. For example, an informative instruction which indicates that user data is compressed causes data de-duplicator 130 to adjust to a different de-duplication technique than that used upon uncompressed user data. For example, larger or smaller user data blocklets may be parsed based upon knowledge of the file type or source application of a portion of user data in a received data stream. In one embodiment, an informative instruction which indicates on offset in the data steam where a particular type or source of user data begins and/or ends causes data de-duplicator 130 to adjust the start and end points of parsed data or take other action to adjust de-duplication. In another embodiment, the informative instruction informs data de-duplicator the locations of interleaved user data within a data stream. In one embodiment, where word processor data from user system 101A is interleaved with spreadsheet data from user system 101B, delimitation instruction generator 232 generates an informative instruction which identifies the file types/source applications and locations of the interleaved user data within backup stream 115. This allows data de-duplicator 130 to de-duplicate each type of data in a particular way and/or to logically un-interleave backup stream 115 when performing de-duplication (this typically increases the de-duplication ratio over simply de-duplicating on the interleaved data stream)

Figure 6A:
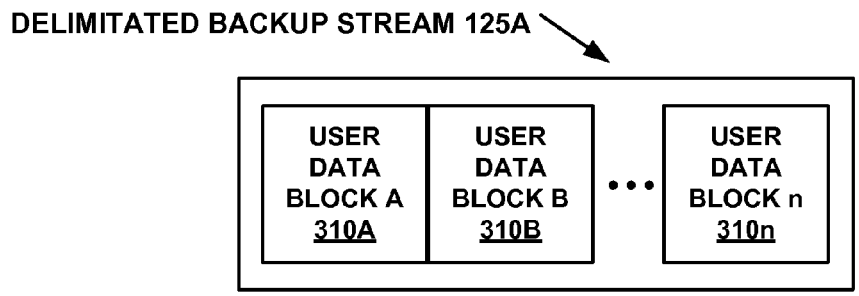
FIGS. 6A, 6B, and 6C show high level block diagram of a delimited backup stream, according to an embodiment.
Figure 6B:
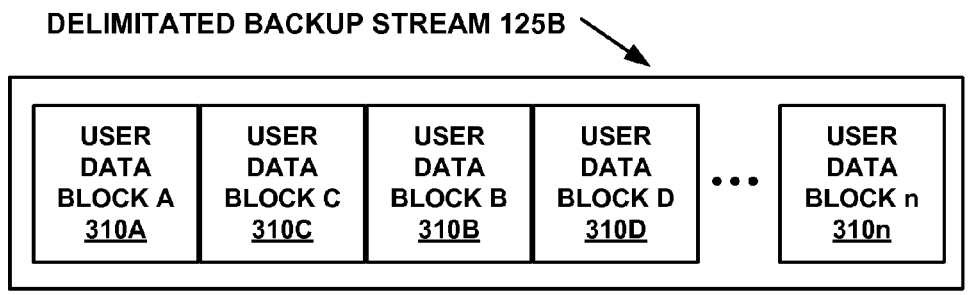
Figure 6C:
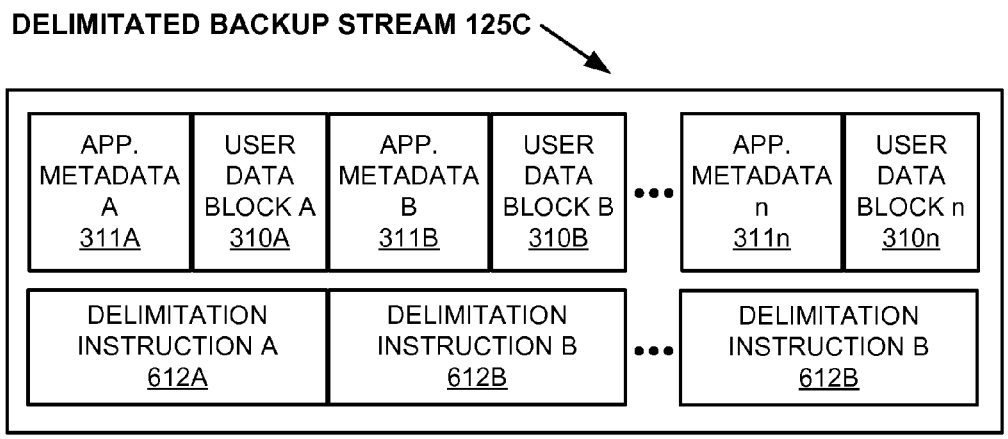

For example, in one embodiment, delimitation instruction generator 232 packages one or more delimitation instructions with backup stream 115 to create delimited backup stream 125; this is illustrated by FIG. 6C. In one embodiment, delimitation instruction generator 232 provides one more delimitation instructions along with an edited data stream such as the edited data streams shown in FIG. 6A or FIG. 6B.

In one embodiment, de-duplication delimitator 230 includes a data stream editor 234. Data stream editor 234 automatically edits a data stream, such as backup stream 115, to remove any identified application metadata, such as backup application metadata and/or non-backup application metadata which has been found and identified. In one embodiment, after this editing, or delimitating, backup stream 115 is condensed into a delimitated backup stream 125, from which identified application metadata has been removed. One example of such a delimitated backup stream 125 is shown in FIG. 6A. In one embodiment, when application metadata identifier determines that user data of different types, from different application sources, and/or from different computer systems is interleaved within a data stream, such as backup stream 115, data stream editor automatically rearranges the user data such that it is un-interleaved. This act of delimitating the data stream allows data de-duplicator 130 to de-duplicate on contiguous types, sources, and/or origins of data; thus increasing the likelihood of achieving a higher de-duplication ratio. FIG. 6B shows one example of a delimitated backup stream 125B, which has been rearranged such that previously interleaved data is un-interleaved.

EXAMPLE BACKUP STREAM

Figure 3:
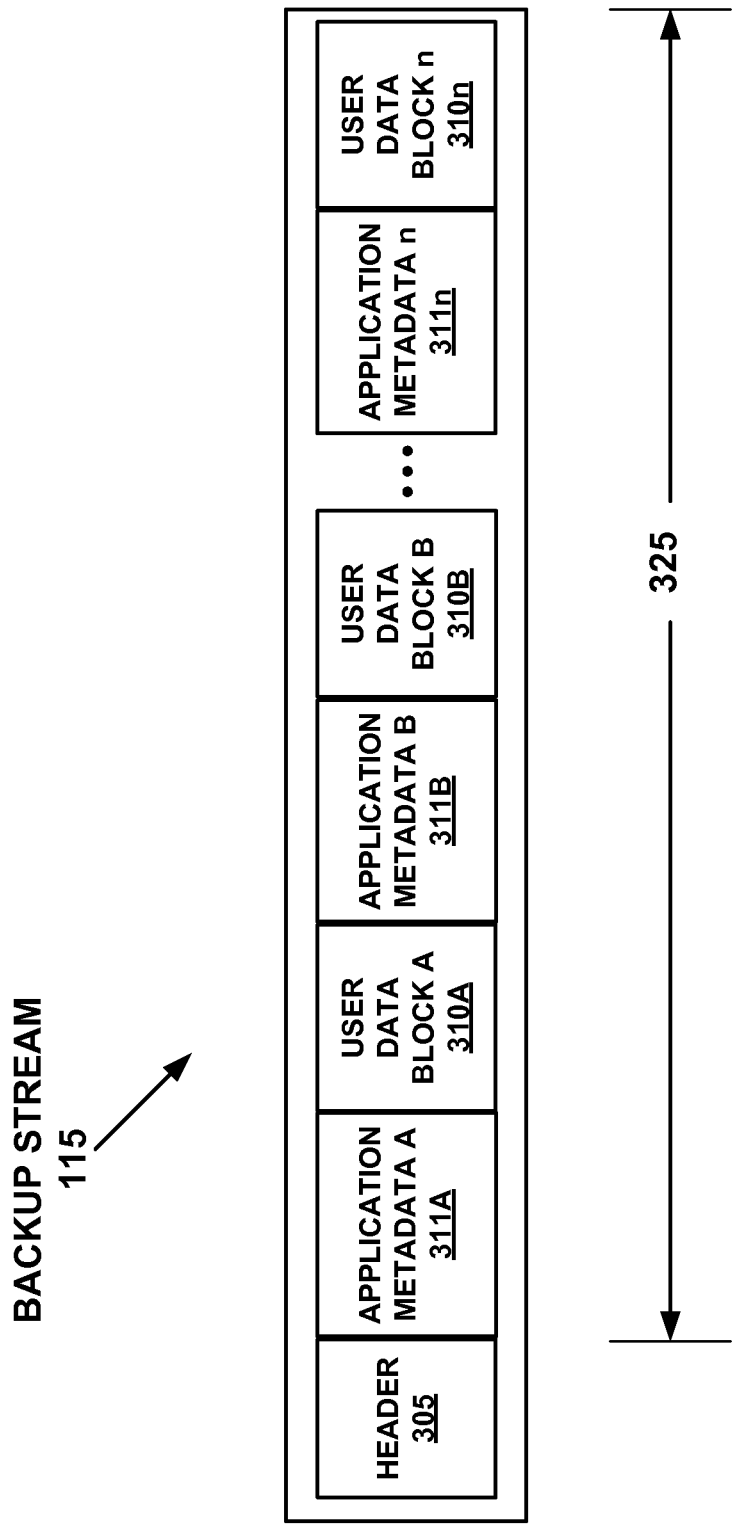
FIG. 3 is a high level block diagram of an example backup stream, according to an embodiment.

FIG. 3 is a high level block diagram of an example backup stream 115, according to an embodiment. As shown in FIG. 3, backup stream 115 has been formatted by a backup application (e.g., user application 110) for a storage target in the form of a VTL, and thus includes an explanatory "tape" header 305. Header 305 is followed by user data blocks (310A, 310B, ... 310n), which are interspersed with backup application metadata blocks (311A, 311B, ... 311n). It is appreciated that this diagram is shown by way of example and not of limitation, and that other data streams do not share identical formatting and that in other embodiments header 305 could be formatted for a storage target which is something other than a VTL. In a backup stream, generally a user data block, such as user data block A (310A) will be sized in kilobytes, such as 64 kilobytes. Backup application metadata, such as application metadata A (311A), which is generated by a backup application will be relatively small in comparison, such as 100 bytes. Many ISV backup applications utilize fixed sizes for backup application metadata and offset the data at regular fixed intervals within a backup stream. In FIG. 3, range 325, represents a range which is shown edited into various embodiments of a delimitated backup stream 125 in FIGS. 6A, 6B, and 6C.

Although not illustrated in FIG. 3, it is appreciated that in some embodiments, header information from a user application, other than a backup application, may be interspersed within user data, such as user data block A (310A). For example, when the user data comprises database archive or an electronic mail archive it can include a header to the archive and/or even to individual electronic mail messages or files within the archives In one embodiment, when a source application of user data, such as a range of user data in block 310A, is identified by source application identifier 220, application metadata identifier 120 also searches for and identifies header information within the user data which is associated with the source application. In one embodiment, delimitation instruction generator 232, generates an informative instruction to flag such an identified header to data de-duplicator 130 such that the header within the user data can receive special treatment (such as being ignored) during parsing or other data de-duplication actions.

EXAMPLE A PRIORI LIST OF METADATA SIGNATURES

FIG. 4 shows an example a priori list of application metadata signatures 212, according to an embodiment. As described herein, a list of metadata signatures can be compiled for a variety of different types of source application metadata which may appear in a backup stream. As there are dozens of ISVs which offer backup applications, such a list of metadata signatures may include 1, 50, 100, or more signatures which are associated with metadata inserted by an associated ISV backup application. Additionally or alternatively, the list of metadata signatures can comprise metadata signatures of non-backup applications (e.g., a metadata signature associated with an electronic mail application). This a priori list of application metadata signatures 212 is something that is known beforehand. As such, in one embodiment a priori list 212 can be compiled and shipped with storage appliance 100. A priori list 212 can be also be electronically updated to add, remove, or change source application metadata signatures over time.

Example a priori list 212 which is shown in FIG. 4 includes six metadata signatures, numbered 1 through 6, which are unique portions common to application metadata generated by one or more source applications. For purpose of example, and not of limitation, it will be assumed that each of these numbered metadata signatures is associated with application metadata generated by a different source application. In one embodiment, all of the source applications comprise different ISV backup applications. In another embodiment, the source applications comprise a combination of different ISV backup applications and non-backup applications (e.g., an electronic mail application or a database application, among others).

Using an a priori list, such as example a priori list 212, and techniques described herein a backup stream can be searched to find a known application metadata signature within the backup stream. Once a metadata signature is found, the source application of the user data can be identified and it can be confirmed that the hit is actually application metadata. In one embodiment, the confirmation is made by another invocation of string searcher 214 to perform a more comprehensive search on the "hit." In one embodiment, rather that brute force searching on the a priori list, an optimized text string search structure can be developed from the list. The underlined portions, represent an example of information which is keyed upon for use by a string search data structure, an example of which is illustrated in FIG. 5.

EXAMPLE STRING SEARCH DATA STRUCTURE

FIG. 5 shows a diagram of an example string search data structure 216 in the form of a trie, according to an embodiment. It is appreciated that in other embodiments, string search data structure 216 can take other forms such as a table. In the embodiment illustrated by FIG. 4, example string search data structure 216 has been optimized from example a priori list 212 illustrated in FIG. 5. As can be seen, any of the six metadata signatures (1, 2, 3, 4, 5, or 6) can be quickly ruled in (for further searching) or out by making as little as one and as many as three comparisons. For example, if a bit of backup stream 115 is not a "b" or a "c" searching on the bit will cease and move to the next bit. If the bit is a "b" or a "c" searching will continue in accordance with the structure specified the trie until a sequence of bits is ruled in or out as matching a keyed upon portion of a metadata signature included in a priori list 212 of FIG. 4. As can be seen fewer searches are typically utilized to search a data stream for contents of an a priori list in this manner as compared to the number of searches required by brute force searching.

EXAMPLE DELIMITATED BACKUP STREAM

FIGS. 6A, 6B, and 6C are a high level block diagram of a delimitated backup stream 125, according to an embodiment.

FIG. 6A represents an example edited version of range 325 of example backup stream 115 (FIG. 3). Data stream editor 234 has automatically edited out application metadata 311A, 311B . . . 311n, which was identified by source application identifier 220 working in conjunction with metadata signature finder 210. The result is delimitated backup stream 125A. This removes the identified application metadata from consideration by data de-duplicator 130 during parsing for de-duplication, and prevents the confounding of data de-duplicator 130 that the presence of the removed application metadata could cause. It is appreciated that application metadata which is edited out is stored, in one embodiment, such that it can be reassembled to recreate backup stream 115.

FIG. 6B represents an example edited version of range 325 of example backup stream 115 (FIG. 3). As in FIG. 6A, application metadata has been removed, however in some embodiments it is not removed. For purposes of this example, backup stream 115 comprises user data (user data 310A, 310C) from a first source application which is interleaved with user data (user data 310A, 310C) from a second source application. Data stream editor 234 has automatically edited backup stream 115 into an un-interleaved/de-multiplexed version of range 325 to produce delimitated backup stream 125B.

FIG. 6C represents an example version of range 325 of example backup stream 115 (FIG. 3). Application metadata has not been removed. For purposes of this example, delimitated backup stream 125C comprises range 325 bundled with one or more delimitation instructions (e.g., delimitation instructions 612A, 612B, 612C). In various embodiments, delimitation instructions 612A, 612B, and 612C represent skip instructions and/or informative instructions. In one embodiment, for example, delimitation instruction 612A is a skip instruction which provides information regarding application metadata 311A, such that data de-duplicator 130 is able to skip or ignore application metadata 311A while parsing or performing other data de-duplication actions on delimitated backup stream 125C. It is appreciated that in some embodiments, delimitation instructions are bundled with edited data streams such as delimitated backup streams 125A and 125B.

EXAMPLE METHOD OF OPERATION

Figure 7:
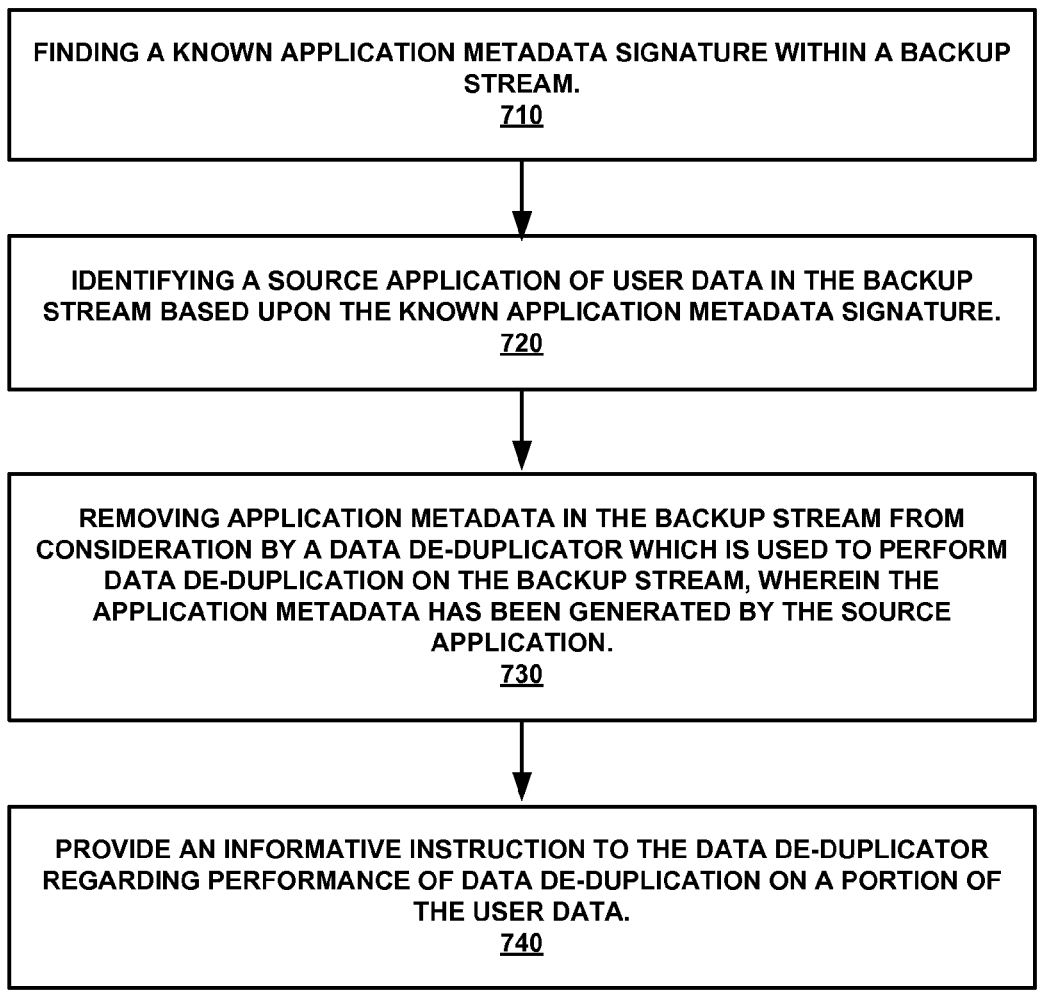
FIG. 7 shows a flow diagram of an example method of identifying application metadata in a backup stream, according to an embodiment.

The following discussion sets forth in detail the operation of some example embodiments. With reference to FIG. 7, flow diagram 700 illustrates example procedures used by various embodiments. Although a specific flow of procedures is disclosed in flow diagram 700, such a flow is provided as an example. That is, embodiments are well suited to performing various other procedures or variations of the procedures recited in flow diagram 700. It is appreciated that the procedures in flow diagram 700 may be performed in an order different than presented, and that not all of the procedures in flow diagram 700 may be performed in every embodiment.

Figure 8:
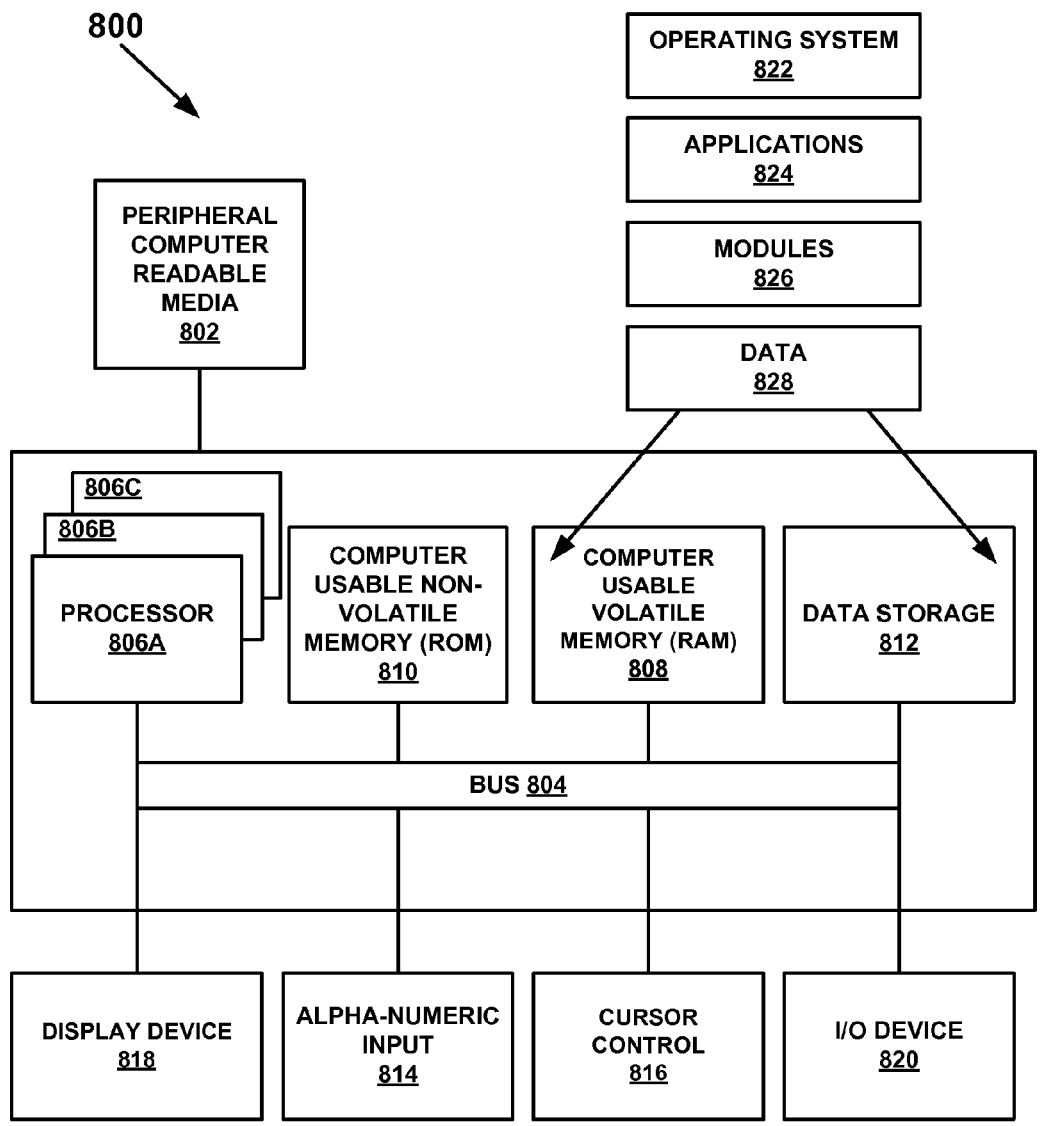
FIG. 8 shows a block diagram of an example computer system, according to an embodiment.

Moreover, flow diagram 700 includes a process that, in various embodiments, is carried out by a processor under the control of computer-readable and computer-executable instructions. The computer-readable and computer-executable instructions for executing the method illustrated by flow diagram 700 reside, for example, in any tangible computer-readable media, such as data storage features internal or external to data storage 812 (FIG. 8) and/or peripheral computer readable media 802 (FIG. 8). For example, in one embodiment, the computer-readable and computer-executable instructions, reside on computer-readable media such as a RAM, ROM, or firmware of an ASIC which, is used to perform the functions of, or operate in conjunction with, for example, application metadata identifier 120. In another example, such computer-readable and computer-executable instructions may reside on computer-readable storage media such as a diskette (e.g., a Compact Disc Read Only Memory (CD-ROM), Digital Versatile Disk (DVD), or the like) and/or RAM, and/or ROM which is used to control operation of a processor in a computer system (e.g., computer system 800) which, a portion of which, in one embodiment is coupled with or included in storage appliance 100 (FIG. 1).

EXAMPLE METHOD OF IDENTIFYING APPLICATION METADATA IN A BACKUP STREAM

FIG. 7 shows a flow diagram 700 of an example method of identifying application metadata in a backup stream, according to an embodiment. Reference will be made to components and portions of FIGS. 1, 2, 3, 4, 5, 6A, 6B, and 6C to assist in the description of the procedures of the method illustrated by flow diagram 700.

At 710 of flow diagram 700, in one embodiment, the method finds a known application metadata signature within a backup stream. In one embodiment, metadata signature finder 210 of application metadata identifier 120 finds this metadata signature, as has been previously described. Depending upon what is being searched for and what is within the backup stream, the found metadata signature can belong to a backup application, such as an ISV backup application, or to a non-backup application, such as an electronic mail application.

In one embodiment, the finding involves searching on a provided a priori list, such as a priori list of application metadata signatures 212. This can comprise searching on the entire contents of a priori list 212 or on some subset of the contents of a priori list 212. For example, in one embodiment, based upon a user input of regarding types of source applications, a priori list 212 is winnowed to a subset which includes only metadata signatures applicable to the user identified source applications. In one embodiment, this providing of an a priori list can include compiling such a list in advance of the searching and including the a priori list 212 with or as part of application metadata identifier 120 at a time of manufacture, or at some later time such as via an electronic update. In one embodiment, the known metadata signatures that are included in the a priori list 212 are those that are associated with source applications which may or are likely to generate application metadata that will be in a data stream, such as backup stream 115. For example, in one embodiment the a priori list includes metadata signatures for each source application from a compressive list of known ISV backup applications that has been compiled. In one embodiment, where the a priori list is included in application metadata identifier 120, the known metadata signature is found by searching on the a priori list of application metadata signatures within a received backup stream. This can comprise brute force searching or other forms of searching of backup stream 115 based upon a priori list 212.

In one embodiment, the finding involves assembling an a priori list of application metadata signatures 212 (which can be compiled in advance in a lab, factory, or other location). This list can then be provided to string searcher 214, which, in one embodiment automatically generates an optimized string search data structure 216 for the string search algorithm that is employed by string searcher 214. In another embodiment, a string search data structure 216 is generated independently from string searcher 214 using a priori list of application metadata signatures 212, and then provided for use by string searcher 214. String searcher utilizes a string search algorithm to search on string search data structure 216 within backup stream 115 to find metadata signatures from the a priori list of application metadata signatures 212.

It is appreciated that the string search data structure 216 is generated in a form which is utilized by the string search algorithm employed by string searcher 214. This can include generating the optimized search data structure for a string search algorithm from a group of string search algorithms which include, but are not limited to: a Boyer-Moore-Horspool algorithm, a Knuth-Morris-Pratt algorithm, an Aho-Corasick algorithm, an Apostolico-Giancarlo algorithm, Commentz-Walter algorithm, and a Rabin-Karp algorithm. String search data structure 216, in various embodiments, is generated from a priori list 212 as a string search data structure in the form of a trie (prefix tree), a table, or some other format as dictated by string searcher 214.

At 720 of flow diagram 700, in one embodiment, the method identifies a source application of user data in the backup stream based upon the known application metadata signature which has been found. In one embodiment, source application identifier 220 identifies the source application in the manner previously described. In one embodiment, for example, source application identifier 220 identifies the source application by cross referencing a source application which is associated with the metadata signature, such as in a table. By identifying the source application which has generated user data (which may be only some subset of the entirety of user data in backup stream 115), information such as the size and offset of application metadata can be discerned and used to find, identify, and/or remove the application metadata which is generated by the source application and included in backup stream 115.

At 730 of flow diagram 700, in one embodiment, the method removes application metadata in the backup stream from consideration by a data de-duplicator which is used to perform data de-duplication on the backup stream. The application metadata which is removed from consideration has been identified previously identified as having been generated by a source application associated with a metadata signature found in the backup stream. In one embodiment, de-duplication delimitator 230 of application metadata identifier 120 operates to delimitate, alter, or demarcate backup stream 115 and thus remove identified application metadata from consideration for de-duplication by data de-duplicator 130. In one embodiment, delimitated backup stream 125 represents a delimitated version of backup stream 115. As described previously, in one embodiment, this comprises data stream editor 234 automatically editing backup stream 115 to remove identified application metadata and produce delimitated backup stream 125 (see examples in FIGS. 6A and 6B). In another embodiment, delimitated backup stream 125 comprises one or more delimitation instructions, such as skip instructions and/or informative instructions, which are generated by delimitation instruction generator 232 and bundled with backup stream 115 or an edited version of backup stream 115. In one embodiment, a skip instruction instructs data de-duplicator 130 on the location and size of an identified application metadata within backup stream 115, so that data de-duplicator 130 can ignore this identified portion of application metadata or otherwise remove the identified portion from consideration during conduct of all or part of its de-duplicating process on backup stream 115.

At 740 of flow diagram 700, in one embodiment, the method provides an informative instruction to the data de-duplicator regarding performance of data de-duplication on a portion of said user data. In one embodiment, delimitation instruction generator 232 generates and then provides data de-duplicator 130 with an informative instruction regarding the data source, application source, and/or data type of one or more portions (e.g. block 310A and block 310B) of user data in a data stream. This allows data-de-duplicator 130 to take an action regarding the manner in which de-duplication is performed on the user data about which the informative instruction provides information. In one embodiment, this action comprises logically rearranging multiplexed or interleaved blocks of user data into logically contiguous (de-multiplexed) streams during de-duplication.

EXAMPLE COMPUTER SYSTEM ENVIRONMENT

FIG. 8 shows a block diagram of an example computer system 800, according to an embodiment. With reference now to FIG. 8, portions of the subject matter comprise or can comprise computer-readable and computer-executable instructions that reside, for example, in computer-usable media of a computer system. That is, FIG. 8 illustrates one example of a type of computer that can be used to implement some embodiments of the subject matter which are discussed herein. FIG. 8 illustrates an example computer system 800 used in accordance with embodiments of the subject matter. It is appreciated that computer system 800 of FIG. 8 is an example, and that an embodiment of the subject matter can operate on or within a number of different computer systems including general purpose networked computer systems, embedded computer systems, optical computer systems, virtual computer systems, database systems, server devices, client devices, various intermediate devices/nodes, stand alone computer systems, and computer systems included in or coupled with backup appliances, network attached storage devices, virtual tape libraries, and/or the like. As shown in FIG. 8, computer system 800 of FIG. 8 is well adapted to having peripheral computer readable media 802 such as, for example, a floppy disk, a compact disc, and the like coupled thereto.

Computer system 800 of FIG. 8 includes an address/data bus 804 for communicating information, and a processor 806A coupled to bus 804 for processing information and instructions. As depicted in FIG. 8, computer system 800 is also well suited to a multi-processor environment in which a plurality of processors 806A, 806B, and 806C are present. Conversely, computer system 800 is also well suited to having a single processor such as, for example, processor 806A. Processors 806A, 806B, and 806C may be any of various types of microprocessors.

Computer system 800 also includes data storage features such as a computer usable volatile memory 808, e.g. random access memory (RAM), coupled to bus 804 for storing information and instructions for processors 806A, 806B, and 806C. Computer system 800 also includes computer usable non-volatile memory 810, e.g. read only memory (ROM), coupled to bus 804 for storing static information and instructions for processors 806A, 806B, and 806C. Also present in computer system 800 is a data storage 812 (e.g., one or more magnetic or optical disks and drives and/or solid state storage units) coupled to bus 804 for storing information and instructions such as computer executable instructions.

Computer system 800 also includes, in one embodiment, an optional alphanumeric input device 814 including alphanumeric and function keys coupled to bus 804 for communicating information and command selections to processor 806A or processors 806A, 806B, and 806C. Computer System 800 also includes, in one embodiment, an optional cursor control device 816 coupled to bus 804 for communicating user input information and command selections to processor 806A or processors 806A, 806B, and 806C. Computer system 800 also includes, in one embodiment, an optional display device 818 coupled to bus 804 for displaying information.

Referring still to FIG. 8, optional display device 818 may be a liquid crystal device, cathode ray tube, plasma display device or other display device suitable for creating, presenting, or displaying graphic images and/or symbols or alphanumeric characters recognizable to a user. Optional cursor control device 816 allows the computer user to dynamically signal the movement of a visible symbol (cursor) on a display screen of display device 818. Many implementations of cursor control device 816 are known in the art including a trackball, mouse, touch pad, joystick, directional and input keys on a multimedia remote control, or special keys on alphanumeric input device 814 capable of signaling movement of a given direction or manner of displacement. Alternatively, it will be appreciated that a cursor can be directed and/or activated via input from alphanumeric input device 814 using special keys and key sequence commands. Computer system 800 is also well suited, in an embodiment, to having a cursor directed by other means such as, for example, voice commands.

Computer system 800 also includes, in one embodiment, an I/O device 820 for coupling computer system 800 with external entities. For example, in one embodiment, I/O device 820 is a modem for enabling wired or wireless communications between computer system 800 and an external network such as, but not limited to, the Internet.

Referring still to FIG. 8, various other components are depicted for computer system 800 and may be included in various embodiments. Specifically, when present, an operating system 822, applications 824, modules 826, and data 828 are shown as typically residing in one or some combination of computer usable volatile memory 808, e.g. random access memory (RAM), and data storage 812. In some embodiments, the subject matter discussed herein is stored, for example, as an application 824 or module 826 in memory locations within RAM 808, computer readable media within data storage 812, and/or peripheral computer readable media 802.

Example embodiments of the subject matter are thus described. Although embodiments of the subject matter have been described in a language specific to structural features and/or methodological acts, it is to be understood that the embodiments of the subject matter defined in the appended claims is not necessarily limited to the specific features or acts described above. Rather, the specific features and acts described above are disclosed as example forms of implementing the claims.

What is claimed is:

1. A non-transitory computer readable medium storing computer executable instructions that when executed by a computer cause the computer to perform a data de-duplication method, the method comprising:

controlling a data de-duplicator to receive a backup stream, where the backup stream includes one or more of, backup application metadata produced by a backup application and non-backup application metadata produced by an application other than the backup application;

controlling the data de-duplicator to identify selected backup metadata in the backup stream;

controlling the data de-duplicator to identify selected non-backup application metadata in the backup stream;

creating a second backup stream where the selected backup metadata and the selected non-backup application metadata are removed from consideration for de-duplication; and controlling the data de-duplicator to de-duplicate the second backup stream.

2. The non-transitory computer readable medium of claim 1, where the backup application is an independent software vendor backup application.

3. The non-transitory computer readable medium of claim 2, where the application other than the backup application is an email application or a database application.

4. The non-transitory computer readable medium of claim 1, where creating the second backup stream comprises preventing the selected backup metadata and the selected non-backup application metadata from entering the second backup stream.

5. The non-transitory computer readable medium of claim 1, where creating the second backup stream comprises adding a skip instruction to the second backup stream, where the skip instruction is associated with the selected backup metadata and the selected non-backup application metadata, and where the skip instruction is configured to cause the data de-duplicator to not consider the selected backup metadata and the selected non-backup application metadata as data to be de-duplicated.

6. The non-transitory computer readable medium of claim 1, where creating the second backup stream includes placing delimiters around the selected backup metadata and the selected non-backup application metadata in the second backup stream, where the delimiters are configured to cause the data de-duplicator to not consider the selected backup metadata and the selected non-backup application metadata as data to be de-duplicated.

7. A storage appliance comprising:
a plurality of storage devices;
a data de-duplicator coupled to the plurality of storage devices and configured for de-duplicating a backup stream prior to storing de-duplicated information from the backup stream on the plurality of storage devices; and
an application metadata identifier coupled to the data de-duplicator and configured for identifying metadata within the backup stream as received by the storage appliance, where the application metadata identifier comprises:
a metadata signature finder configured to find a known application metadata signature in the backup stream as received by the storage appliance;
a source application identifier configured to identify a source application of user data in the backup stream as received by the storage appliance, based on the known application metadata signature;
a de-duplication delimitator configured to remove application metadata in the backup stream as received by the storage appliance from consideration by the data de-duplicator during the de-duplicating to produce a second backup data stream, where the application metadata includes metadata produced by a backup application and metadata produced by an application other than the backup application,
where removing the application metadata from the backup stream as received by the storage appliance includes producing the second backup data stream by physically excluding the application metadata, or producing the second data stream by logically excluding the application metadata; and
a data de-duplicator configured to de-duplicate the second backup stream, where the second backup stream may include data configured to logically exclude the application metadata.

* * * * *